United States Patent
Veluswamy et al.

(10) Patent No.: US 11,520,715 B2
(45) Date of Patent: Dec. 6, 2022

(54) DYNAMIC ALLOCATION OF STORAGE RESOURCES BASED ON CONNECTION TYPE

(71) Applicant: Western Digital Technologies, Inc., San Jose, CA (US)

(72) Inventors: Senthil Kumar Veluswamy, Bangalore (IN); Rahul Gandhi Dhatchinamoorthy, Bangalore (IN); Kumar Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,816

(22) Filed: Feb. 23, 2021

(65) Prior Publication Data
US 2022/0229787 A1   Jul. 21, 2022

Related U.S. Application Data

(60) Provisional application No. 63/138,067, filed on Jan. 15, 2021.

(51) Int. Cl.
*G06F 13/16* (2006.01)
*G06F 13/28* (2006.01)
*G06F 9/50* (2006.01)

(52) U.S. Cl.
CPC ........ *G06F 13/1668* (2013.01); *G06F 9/5016* (2013.01); *G06F 13/28* (2013.01)

(58) Field of Classification Search
CPC ....................................................... G06F 9/50
See application file for complete search history.

(56) References Cited

U.S. PATENT DOCUMENTS

| | | | |
|---|---|---|---|
| 8,595,438 B1* | 11/2013 | Clark | G06F 11/3409 711/119 |
| 9,563,480 B2 | 2/2017 | Messerli et al. | |
| 2005/0162944 A1* | 7/2005 | Ball | G06F 12/023 711/E12.006 |
| 2008/0072226 A1* | 3/2008 | Armes | G06F 9/505 718/101 |
| 2015/0006733 A1 | 1/2015 | Khan et al. | |
| 2015/0363113 A1* | 12/2015 | Rahman | G06F 16/24524 711/170 |

* cited by examiner

*Primary Examiner* — Idriss N Alrobaye
*Assistant Examiner* — Ronald T Modo
(74) *Attorney, Agent, or Firm* — Patent Law Works LLP

(57) ABSTRACT

Systems and methods for capped allocation of storage resources based on connection type are described. A new storage connection request from a host system to a group of data storage devices includes a connection type, such as a remote direct memory access connection or transmission control protocol connection. Based on the connection type, a subset of a pool of allocated storage resources for that connection type is determined. If the new connection request does not exceed the maximum number of connections allocated to the subset, a new storage connection is established. If the new connection request exceeds the maximum number of connections allocated to the subset, the new storage connection request fails.

20 Claims, 8 Drawing Sheets

DYNAMIC ALLOCATION OF STORAGE RESOURCES BASED ON CONNECTION TYPE

TECHNICAL FIELD

The present disclosure generally relates to storage systems supporting a plurality of hosts and, more particularly, to dynamic allocation of storage resources in response to host requests.

BACKGROUND

Multi-device storage systems utilize multiple discrete data storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips from Mellanox or Kazan to translate commands from external NVMe-OF (Non-Volatile Memory Express over Fabrics) protocol to internal NVMe (NVM Express) protocol. These architectures may be configured to support various Quality of Service (QoS) metrics and requirements to support host applications, often supporting a plurality of host systems with different workload requirements.

The systems may be deployed in data centers to support cloud computing services, such as platform as a service (PaaS), infrastructure as a service (IaaS), and/or software as a service (SaaS). Data centers and their operators may offer defined (and sometime contractually guaranteed) QoS with responsive, on-demand provisioning of both hardware and software resources in multi-tenant systems. Various schemes for dynamic resource allocation may be used at different levels of the system hierarchies and roles. Prior resource allocation schemes may not provide optimal allocation of non-volatile memory resources among a plurality of hosts with differing workloads in a multi-tenant system.

Therefore, there still exists a need for storage systems with dynamic resource allocation configurations for back-end non-volatile memory resources.

SUMMARY

Various aspects for dynamic allocation of storage resources based on connection type and at connection time are described. More particularly, responsive to connection requests, a controller may determine desired ratios between connection types and resource pools and cap the connections allowed for a subset of each resource pool, such as processing cores and/or queue pairs. Connections exceeding the maximums for the resource subsets may be failed.

One general aspect includes a system that includes: a processor; a memory; a storage interface configured to communicate with a plurality of data storage devices and support a first connection type and a second connection type; and a resource allocation engine. The resource allocation engine is configured to: determine, for a new storage connection request, a connection type selected from the first connection type and the second connection type; determine, based on the connection type, an allocated number for a first connection type subset of a first pool of allocated storage resources; and establish, responsive to the new storage connection request, a new storage connection with the first connection type subset of the first pool of allocated storage resources.

Implementations may include one or more of the following features. The resource allocation engine may be further configured to: determine a maximum number of connections for the first connection type subset of the first pool of allocated storage resources; determine whether the new storage connection request exceeds the maximum number of connections for the first connection type subset of the first pool of allocated storage resources; and fail, responsive to the new storage connection request exceeding the maximum number of connections for the first connection type subset of the first pool of allocated storage resources, the new storage connection request. The resource allocation engine may be further configured to: determine, based on the connection type, an allocated number for a second connection type subset of the first pool of allocated storage resources; determine a maximum number of connections for the second connection type subset of the first pool of allocated storage resources; determine whether the new storage connection request exceeds the maximum number of connections for the second connection type subset of the first pool of allocated storage resources; and establish, responsive to the new storage connection request not exceeding the maximum number of connections for the second connection type subset of the first pool of allocated storage resources, the new storage connection with the first pool of allocated storage resources. The first connection type subset may correspond to the first connection type using a first connection protocol, the second connection type subset may correspond to the second connection type using a second connection protocol, the resource allocation engine may be further configured to determine an allocation ratio between a first connection type and a second connection type for the first pool of allocated resources; and the maximum number of connections of the first connection type subset and the maximum number of connections of the second connection type subset may correspond to the allocation ratio applied to the first pool of allocated resources. The first connection type may be a remote direct memory access connection for accessing the plurality of data storage devices and the second connection type is a transmission control protocol connection for accessing the plurality of data storage devices. The resource allocation engine may be further configured to: monitor read/write operations executed through the storage interface; determine a read/write ratio based on the monitored read/write operations; adjust, based on the read/write ratio, a resource ratio; and recalculate, based on the resource ratio, the maximum number of connections for the first connection type subset of the first pool of allocated storage resources. The processor may include a plurality of processor cores, the first pool of allocated resources may include assignments to the plurality of processor cores, and the first connection type subset of the first pool of allocated resources may correspond to a core ratio allocated to a first connection type. The resource allocation engine may be further configured to: determine, based on the connection type, an allocated number for a first connection type subset of a second pool of allocated storage resources; determine a maximum number of connections for the first connection type subset of the second pool of allocated storage resources; determine whether the new storage connection request exceeds the maximum number of connections for the first connection type subset of the second pool of allocated storage resources; and establish, responsive to the new storage connection request not exceeding the maximum number of connections for the first connection type subset of the second pool of allocated storage resources, a new storage connection with the second pool of allocated storage resources. The memory may support a plurality of queue pairs for managing command queues and storage queues for the plurality of data storage devices, the second pool of allocated resources may include assignments to the plurality of queue pairs, and the first connection type subset of the second pool of allocated resources may correspond to a queue pair ratio allocated to the first connection type. The resource allocation engine may be further configured to: determine the core ratio from a set of configuration parameters stored in the memory; and determine the queue pair ratio from the set of configuration parameters stores in the memory; and the core ratio is different from the queue pair ratio.

Another general aspect includes a computer-implemented method that includes: configuring a storage node for communication with a plurality of data storage devices, where the storage node controls at least one pool of storage resources for allocation to host storage connections; determining, for a new storage connection request, a connection type selected from a first connection type and a second connection type; determining, based on the connection type, a first connection type subset of a first pool of allocated storage resources; and establishing, responsive to the new storage connection request, a new storage connection with the first connection type subset of the first pool of allocated storage resources.

Implementations may include one or more of the following features. The computer-implemented method may include: determining a maximum number of connections for the first connection type subset of the first pool of allocated storage resources; determining whether the new storage connection request exceeds the maximum number of connections for the first connection type subset of the first pool of allocated storage resources; and failing, responsive to the new storage connection request exceeding the maximum number of connections for the first connection type subset of the first pool of allocated storage resources, the new storage connection request. The computer-implemented method may include: determining, based on the connection type, a second connection type subset of the first pool of allocated storage resources; determining a maximum number of connections for the second connection type subset of the first pool of allocated storage resources; determining whether the new storage connection request exceeds the maximum number of connections for the second connection type subset of the first pool of allocated storage resources; and establishing, responsive to the new storage connection request not exceeding the maximum number of connections for the second connection type subset of the first pool of allocated storage resources, the new storage connection with the first pool of allocated storage resources. The computer-implemented method may include determining an allocation ratio between a first connection type and a second connection type for the first pool of allocated resources, where: the first connection type subset corresponds to the first connection type using a first connection protocol; the second connection type subset corresponds to the second connection type using a second connection protocol; and the maximum number of connections of the first connection type subset and the maximum number of connections of the second connection type subset correspond to the allocation ratio applied to the first pool of allocated resources. The first connection type may be a remote direct memory access connection for accessing the plurality of data storage devices and the second connection type may be a transmission control protocol connection for accessing the plurality of data storage devices. The computer-implemented method may include assigning each host storage connection to a processor core of a plurality of processor cores, where the first pool of allocated resources includes assignments to the plurality of processor cores and the first connection type subset of the first pool of allocated resources corresponds to a core ratio allocated to the first connection type. The computer-implemented method may include: determining, based on the connection type, a first connection type subset of a second pool of allocated storage resources; determining a maximum number of connections for the first connection type subset of the second pool of allocated storage resources; determining whether the new storage connection request exceeds the maximum number of connections for the first connection type subset of the second pool of allocated storage resources; and establishing, responsive to the new storage connection request not exceeding the maximum number of connections for the first connection type subset of the second pool of allocated storage resources, the new storage connection with the second pool of allocated storage resources. The computer-implemented method may include assigning at least one queue pair from a plurality of queue pairs to each host connection, where: the second pool of allocated resources includes assignments of the plurality of queue pairs; the plurality of queue pairs manages command queues and storage queues for the plurality of data storage devices; and the first connection type subset of the second pool of allocated resources corresponds to a queue pair ratio allocated to the first connection type. The computer-implemented method may include: monitoring read/write operations executed through the storage interface; determining a read/write ratio based on the monitored read/write operations; adjusting, based on the read/write ratio, a resource ratio; and recalculating, based on the resource ratio, the maximum number of connections for the first connection type subset of the first pool of allocated storage resources.

Still another general aspect includes a storage system that includes: a processor; a memory; a plurality of storage devices; means for determining, for a new storage connection request, a connection type selected from a first connection type and a second connection type; means for determining, based on the connection type, a first connection type subset of a first pool of allocated storage resources; means for determining a maximum number of connections for the first connection type subset of the first pool of allocated storage resources; means for determining whether the new storage connection request exceeds the maximum number of connections for the first connection type subset of the first pool of allocated storage resources; and means for establishing, responsive to the new storage connection request not exceeding the maximum number of connections for the first connection type subset of the first pool of allocated storage resources, a new storage connection with the first pool of allocated storage resources.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to non-volatile memory resources by host systems in multi-tenant storage systems, such as by using connection type to dynamically allocate resource pools in configurable ratios. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
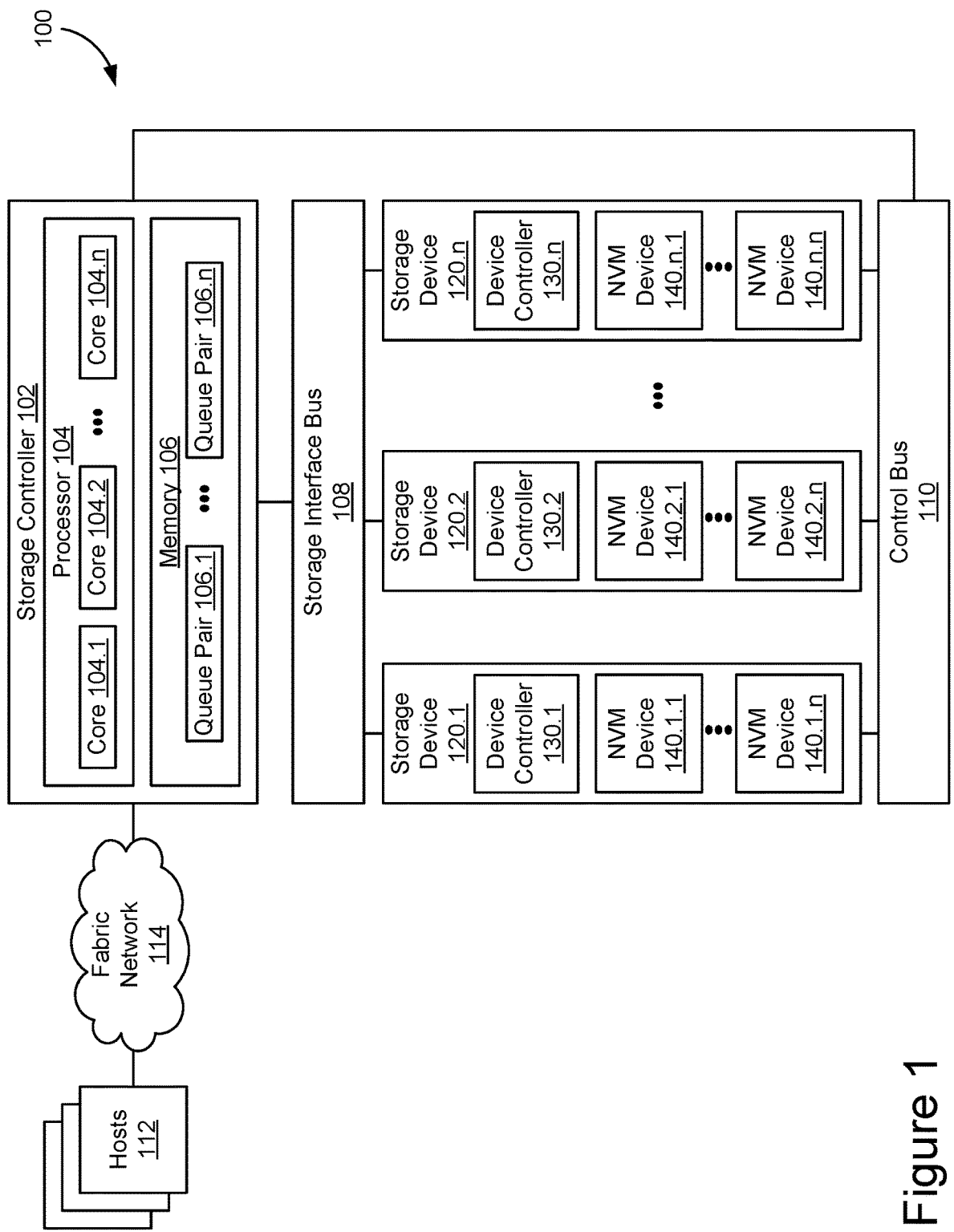
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications. Host systems 112 may be configured to store and access data in the plurality of storage devices 120 in a multi-tenant configuration with shared storage resource pools, such as processor cores 104.1-104.$n$ and/or queue pairs 106.1-106.$n$ allocated in memory 106.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores 104.1-104.$n$ which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a plurality of queue pairs 106.1-106.$n$ allocated between host systems 112 and storage devices 120 to manage command queues and storage queues for host storage operations against host data in storage devices 120. For example, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
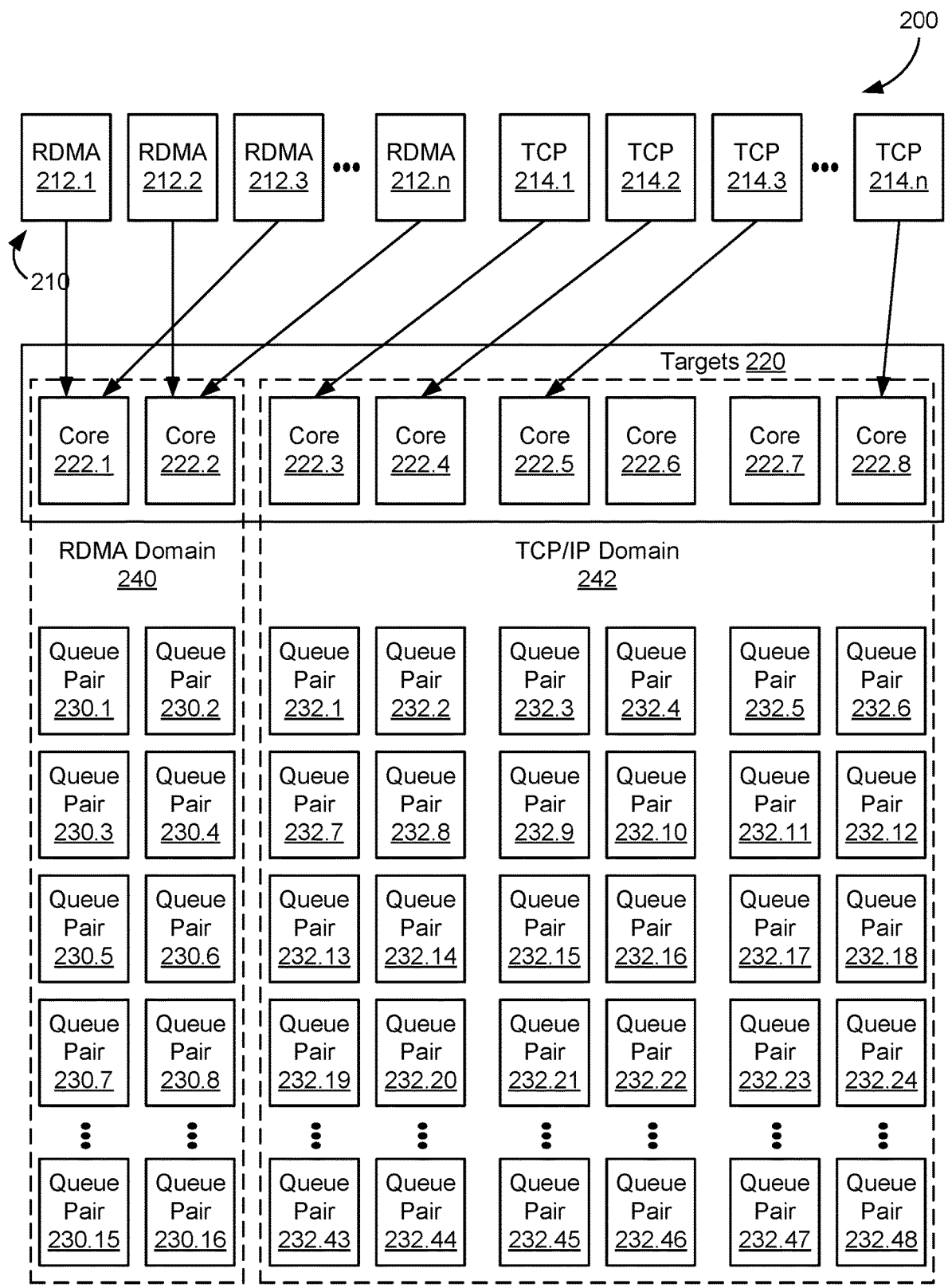
FIG. 2 schematically illustrates a dynamic allocation architecture that may be used by storage nodes of the multi-device storage system of FIG. 1.

FIG. 2 shows a schematic representation of a dynamic allocation architecture 200 that may be used by storage nodes, such as storage controller 102 and storage devices 120 of multi-device data storage system 100 in FIG. 1, to cap storage resource allocations at connection time based on configured ratios. In an example embodiment, the storage node may be configured as an NVMeoF all flash array comprising: a processor with 8 processor cores, memory support for maximum 128 queue pairs per connection, a front-end host bus adapter supporting 100 gigabit (Gb) converged ethernet to a fabric network, 8 dual port PCIe solid state drives (SSDs), and a storage interface bus comprising 16 PCIe generation 3 lanes. For the purposes of the example shown, thirty-two host systems may be configured for RDMA and transmission control protocol/internet protocol (TCP/IP) connections with the storage node (e.g., n=32). Each host node may have both simultaneous RDMA and TCP/IP connections and support one queue pair per connection, so up to 64 queue pairs total. For the example, the storage node may be configured to support a 64 queue pair maximum. In an example embodiment, dynamic allocation architecture 200 may be implemented using a set of storage management tools and libraries, such as the storage performance development kit (SPDK) to configure the host nodes and storage nodes.

The host nodes may initiate storage connections 210 during an operating period. For example, each host node may initiate an RDMA connection 212 and a TCP connection 214 and these connections may be initiated in any order, though the RDMA and TCP connections for a particular host node may often be received proximate one another in time. In prior systems, new connections may be allocated across targets 220 in the order they are received, with cores 222 receiving an even distribution of connections and a varying distribution to connection types. Similarly, queue pairs 230 may be allocated as each connection is established. A user or administrator using the prior systems may have little control over the preference given to the connection types or how they are allocated among cores 222 and queue pairs 230, resulting in possible performance, availability, and/or "noisy neighbor" impacts on QoS metrics, such as input/output and/or error rates.

Using dynamic allocation architecture 200, the storage nodes may allocate targets 220 into subsets for each connection type, such as RDMA domain 240 and TCP/IP domain 242. In some embodiments, dynamic allocation architecture 200 may include one or more desired resource ratios based on connection type in one or more configuration files. For example, a user may determine that preference should be given to TCP/IP connections over RDMA connections. In the example shown, the user has selected and configured an allocation ratio of 3 TCP/IP connections to 1 RDMA connection. The processor core pool is divided between the connection types according to the configured core allocation ratio. Thus, the processor core pool contains 8 cores, the RDMA subset in RDMA domain 240 includes processor cores 222.1 and 222.2, and the TCP/IP subset in TCP/IP domain 242 includes processor cores 222.3-222.8. In the example shown, the same allocation ratio, 3 TCP/IP connections to 1 RDMA connection, may be used for allocating queue pairs. The queue pair pool is divided between the connection types according to the configured queue pair ratio. Thus, the queue pair pool contains 64 queue pairs, the RDMA subset in RDMA domain 240 includes queue pairs 230.1-230.16 (16 queue pairs), and the TCP/IP subset in the TCP/IP domain 242 includes queue pairs 232.1-232.48 (48 queue pairs). The storage system may track the allocated resources against the actual connections as they are established. In some embodiments, the core ratio and the queue pair ratios may be different, allowing the user greater flexibility in configuring the allocation of resources between the two connection types.

In some embodiments, the NVMe architecture may only support 1:1 mapping of host connections and queue pairs, so when a maximum number of available queue pairs for a connection type is reached, any additional connection requests will fail. Similarly, only RDMA connections may be allocated to the cores in RDMA domain 240 and only TCP/IP connections may be allocated to the cores in TCP/IP domain 242, which may resulting an uneven distribution of connections between the two domains and among individual cores, depending on the distribution of connection requests received from the hosts. Because only connections of the same type are allocated to any given processor, cache coherency may be more easily maintained based on the fabric connection protocol used.

Users may configure the core and queue pair ratios at a granular level to their particular needs to determine how core assignment and connection establishment happens. These settings can be tuned and configured to meet desired QoS needs. In the example shown, better QoS may be achieved for high-priority host applications running on TCP/IP connections as compared to low-priority applications running on RDMA connections. In some embodiments, these connection ratios for one or more resource pools may be configured using ratio parameters in a configuration file or similar data structure. For example, a configuration file in the storage node may include a core ratio value and a queue pair ratio value.

In some embodiments, a system administrator may configure the resource ratios based on workload types and/or historic or standard workload models. For example, the administrator may select core ratios and queue-pair (QP) ratios based on the following table:

| Workload | Nature of Workload | QP ratio | core ratio |
|---|---|---|---|
| Database | 75% write, 25% read | 5:3 | 6:2 |
| Data Warehouse | 75% read, 25%write | 6:2 | 5:3 |
| Vehicle Data | ~80% sequential write, 20% read | 7:1 | 6:2 |
| Internet of Things | ~80% sequential write, 20% read | 7:1 | 6:2 |
| Virtual Desktop | 50% random write, 50% random read | 4:4 | 4:4 |

In some embodiments, the system administrator may set initial ratio configurations for a given storage node and selectively enable an adaptive process for monitoring actual usage and adjusting the ratio values accordingly, as further explained below.

Figure 3:
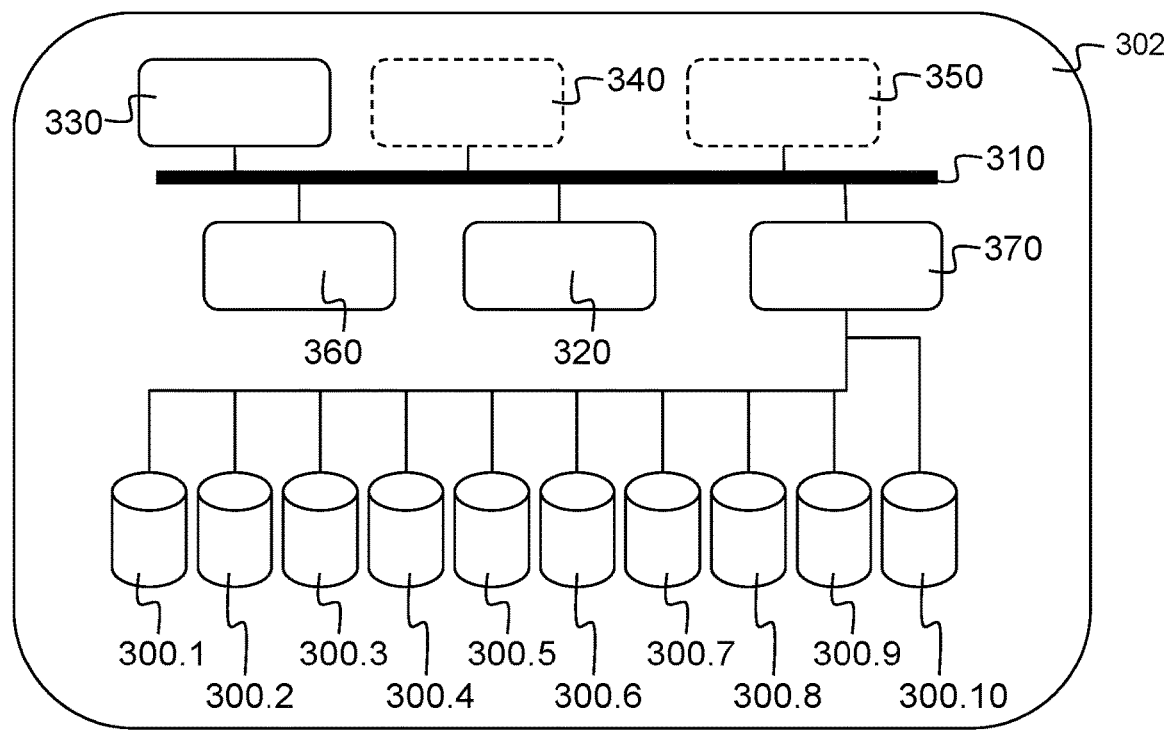
FIG. 3 schematically illustrates a storage node of the multi-device storage system of FIG. 1.

FIG. 3 shows a schematic representation of one of the storage nodes 302. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) SATA-II disk drives or 2 TB NVMe solid state drives (SSDs), and control the reading and writing of data to/from these storage elements 300. As shown in FIG. 3, such a storage node 302 could comprise ten 2 TB SATA-II disk drives as storage elements 300.1-300.10 and in this way storage node 302 would provide a storage capacity of 20 TB to the storage system 100.

Taking into account FIG. 1 and FIG. 3, the storage system 100 may comprises a plurality of storage elements 300. The storage nodes 302 each comprise a share of these storage elements 300. Each storage nodes 302 could comprise a similar amount of storage elements, but this is, however, not essential. Storage node 302 could for example comprise four, eight, ten, or any other number of storage elements appropriate to interface and form factor constraints. The storage system 100 may be operable to store and retrieve a data objects, data blocks, data files, or other data units comprising data, for example, 64 megabytes (MB) of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
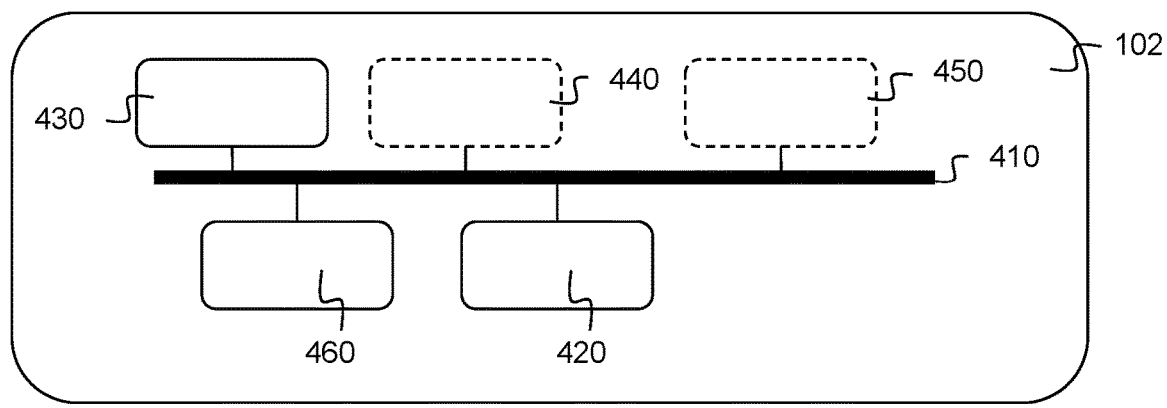
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
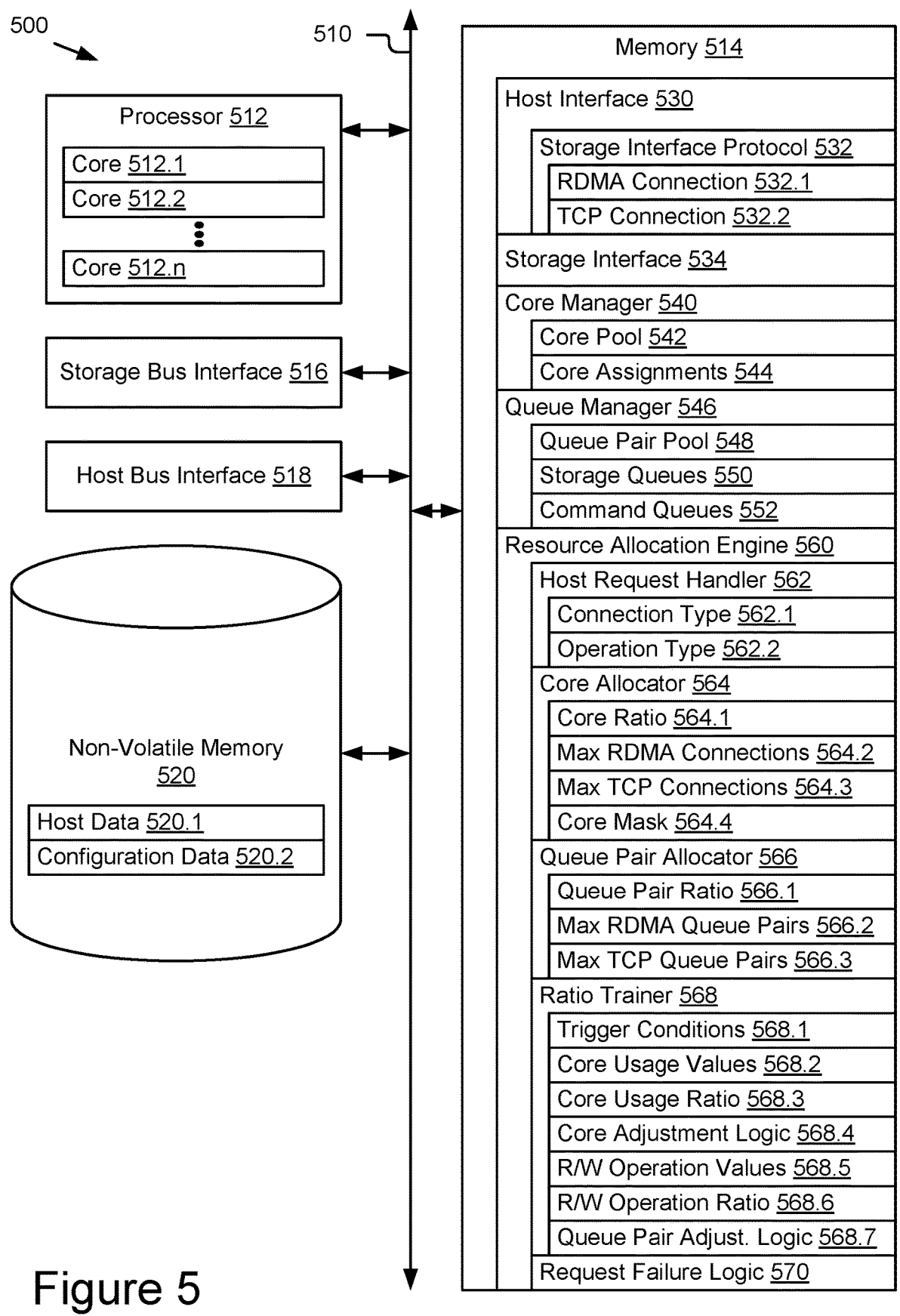
FIG. 5 schematically illustrates some elements of the storage node of FIG. 1-3 in more detail.

FIG. 5 schematically shows selected modules of a storage node 500 configured for capped allocation of storage resources based on connection type, such as the storage nodes of FIGS. 1-3. Storage node 500 may incorporate elements and configurations similar to those shown in FIGS. 1-3. For example, storage node 500 may be configured as storage controller 102 and a plurality of storage devices 120 supporting host connection requests and storage operations from host systems 112 over fabric network 114.

Storage node 500 may include a bus 510 interconnecting at least one processor 512, at least one memory 514, and at least one interface, such as storage bus interface 516 and host bus interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. Host bus interface 518 may include a physical interface for connecting to a one or more host nodes, generally via a network interface. For example. host bus interface 518 may include an ethernet connection to a host bus adapter, network interface, or similar network interface connector supporting NVMe host connection protocols, such as RDMA and TCP/IP connections. In some embodiments, host bus interface 518 may support NVMeoF or similar storage interface protocols.

Storage node 500 may include one or more non-volatile memory devices 520 or similar storage elements configured to store host data. For example, non-volatile memory devices 520 may include a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage interface 534 configured to manage read and write operations to non-volatile memory devices 520. Memory 514 may include a core manager 540 configured manage use of processing resources, such as processor cores and related processing threads. Memory 514 may include a queue manager 546 configured to manage storage and command queues in queue pairs for host storage connections. Memory 514 may include a resource allocation engine 560 configured to manage the dynamic allocation of host connection requests among resource pools, such as processor cores and queue pairs.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more volumes or namespaces in host data 520.1 for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through host bus interface 518 and storage bus interface 518 to host data units 520.1 stored in non-volatile memory devices 520. For example, host interface 530 may include host communication protocols compatible with ethernet and/or another host interface that supports use of NVMe and/or RDMA protocols for data access to host data 520.1. Host interface 530 may further include host communication protocols compatible with accessing storage node and/or host node resources, such memory buffers, processor cores, queue pairs, and/or specialized assistance for computational tasks.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over host bus interface 518 and/or storage bus interface 516. For example, storage interface protocol 532 may include both PCIe and NVMe compliant communication, command, and syntax functions, procedures, and data structures. In some embodiments, storage interface protocol 532 may include an NVMeoF or similar protocol supporting both RDMA connections 532.1 and TCP/IP connections 532.2 for communication between host nodes and target host data in non-volatile memory 520.1, such as volumes or namespaces mapped to the particular host. In some embodiments, host interface 530 may include additional modules (not shown) for command handling, buffer management, storage device management and reporting, and other host-side functions.

Storage interface 534 may include an interface protocol and/or set of functions and parameters for reading, writing, and deleting data units in non-volatile memory devices 520. For example, storage interface 534 may include functions for executing host data operations related to host storage commands received through host interface 530 once a host connection is established. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose.

Core manager 540 may include interfaces, functions, and parameters for managing the use of processor resources for processor 512 and/or other processing resources within storage node 500. For example, core manager 540 may enable processor cores 512.1-512.$n$ of processor 512 to execute operational threads associated with host connections and corresponding queue pairs. Core manager 540 may include a plurality of hardware and/or software modules configured to use processor 512 and memory 514 to identify and manage threads and related operations assigned to cores 512.1-512.$n$. In some embodiments, core manager 540 may include a processor core pool 542 configured to identify the number of available processor cores for host connections and relates storage operations. For example, core pool 542 may include a data structure and related functions for identifying processor cores 512.1-512.$n$ as part of a storage processing pool, as opposed to special purpose processors and/or processors allocated to interface, queuing, storage management, or other controller of interface functions. In some embodiments, core manager 540 may include core assignments 544 configured to manage the assignment of individual host connections and/or related storage operations to specific cores and/or threads operating on those cores. For example, core assignments 544 may include a data structure and related functions for managing processing thread assignments and/or operations executed in those threads. In some embodiments, core manager 540 may be configured to provide processor core pool information to resource allocation engine 560 and receive host connection assignments from resource allocation engine 560.

Queue manager 546 may include interface protocols and a set of functions and parameters for managing command queues and storage queues for operations to be executed against non-volatile memory 520. For example, queue manager 546 may allocate memory space and data structures for storage queues 550 and command queues 552 that receive host storage commands and buffer host data for transfer to or from data storage devices comprising non-volatile memory 520. Queue manager 546 may include a plurality of hardware and/or software modules configured to use processor 512 and memory 514 for managing queue pairs. For example, queue manager 546 may include a queue pair pool 548 configured to identify the number of queue pairs supported by the configuration of storage node 500. For example, queue pair pool 548 may include a set of parameters describing the maximum number, size, and/or other parameters for available queue pairs stored in a data structure. Queue manager 546 may include storage queues 550 and command queues 552 configured to aggregate storage operations and host commands for a particular host connection. For example, storage queues 550 may include a storage queue for each host connection that corresponds to host data transfers between storage node 500 and a respective host node. Command queues 552 may include a command queue for each host connection that corresponds to host commands received from the respective host node that have not yet been resolved by storage node 500. In some embodiments, storage queues 550 and command queues 552 may correspond to buffer memory allocations in storage node 500 and/or host nodes for storing host data and/or host command information for pending storage operations.

Resource allocation engine 560 may include interface protocols and a set of functions and parameters for allocating resources in response to host connection requests and/or enforcing resource caps for each connection type. For example, resource allocation engine 560 use a connection type, such as an RDMA or TCP/IP connection, to determine a subset of core pool 542 and/or queue pair pool 548 to which the connection may be allocated. Resource allocation engine 560 may include hardware and/or software modules configured to use processor 512 and memory 514 for allocating host connections to storage node resources, such as processor cores and queue pairs. In some embodiments, resource allocation engine 560 may include a host request handler 562, a core allocator 564, a queue pair allocator 566, a ratio trainer 568, and request failure logic 570.

In some embodiments, host request handler 562 may include data structures, functions, and/or interfaces configured to receive new connection requests from host nodes. For example, host request handler 562 may receive a new host connection request from host interface 530 and determine a connection type 562.1. In some embodiments, host request handler 562 may be configured with a plurality of connection type definitions and/or logic for determining connection type 562.1 based on the storage interface protocols, port, addressing, and/or other information received with or in the new connection request. In some embodiments, host request handler 562 may also be configured monitor operation types 562.2 after a host connection is established. For example, host request handler 562 may include, manage, and/or access an operation log for each host connection and aggregate host operation parameters, such as counts and/or data volumes of different operation types 562.2 (e.g., read operations, write operations, etc.).

In some embodiments, core allocator 564 may include data structures, functions, and/or interfaces configured to allocate new host connection requests to a particular processor core. For example, core allocator 564 may use connection type 562.1 determined by host request handler 562 to determine a connection type subset of core pool 542 and select a particular processor core within that subset to receive the host connection. In some embodiments, core allocator 564 may use a core ratio 564.1 to divide core pool 542 into connection type subsets, such as an RDMA connection subset and a TCP/IP connection subset. For example, core ratio 564.1 may be read from configuration data 520.2 and provide a user configurable allocation between cores assigned to RDMA connections and cores assigned to TCP/IP connections. In some embodiments, processor cores 512.1-512.$n$ may be configured to each support a maximum number of connections. For example, storage node 500 may support a maximum number of operating threads per core. A maximum number of core RDMA connections 564.2 may be determined based on multiplying the number of cores allocated to RDMA connections times the maximum number of operating threads per core. A maximum number of core TCP/IP connections 564.3 may be determined based on multiplying the number of cores allocated to TCP/IP connections times the maximum number of operating threads per core. In some embodiments, core allocator 564 may track the total number of active host connections in each connection type subset and fail new host connection requests that exceed the maximum number for that connection type. In some embodiments, core allocator 564 may define a core mask 564.4 that facilitates allocation of new connections to the connection type subset corresponding to their connection type. For example, core mask 564.4 may mask the existence of the cores in the other connection type subset from new connection requests, such that the new connection can only be established with cores in the corresponding connection type subset.

In some embodiments, queue pair allocator 566 may include data structures, functions, and/or interfaces configured to allocate new host connection requests to a particular pair queue. For example, queue pair allocator 566 may use connection type 562.1 determined by host request handler 562 to determine a connection type subset of queue pair pool 548 and allocate a queue pair within that subset for the host connection. In some embodiments, queue pair allocator 566 may use a queue pair ratio 566.1 to divide queue pair pool 548 into connection type subsets, such as an RDMA connection subset and a TCP/IP connection subset. For example, queue pair ratio 566.1 may be read from configuration data 520.2 and provide a user configurable allocation between queue pairs assigned to RDMA connections and queue pairs assigned to TCP/IP connections. In some embodiments, queue pair pool 548 may be configured with a maximum number of queue pairs. For example, storage node 500 may support a maximum number of operating queue pairs, such as 128 queues or 64 queue pairs. A maximum number of RDMA queue pairs 566.2 may be determined based on dividing queue pair pool 548 according to queue pair ratio. A maximum number of TCP/IP queue pairs 566.3 may be determined based on dividing queue pair pool 548 according to queue pair ratio.

In some embodiments, ratio trainer 568 may include data structures, functions, and/or interfaces configured to adjust resource ratios over an operating time based on actual usage of storage node 500. For example, ratio trainer 568 may monitor and/or access resource usage values and periodically determine whether resource ratios, such as core ratio 564.1 and queue pair ratio 566.1, should be adjusted and, if so, by what adjustment value. In some embodiments, ratio trainer 568 may include one or more trigger conditions 568.1 for initiating an adjustment of one or more resource ratios. For example, ratio trainer 568 may include one or more logical trigger conditions 568.1, such as a periodic schedule, elapsed time, number of operations, operating condition, host command trigger, or other event-based trigger for invoking periodic checks of resource usage.

In some embodiments, ratio trainer 568 may be configured to monitor or access core usage values 568.2 for calculating a core usage ratio 568.3 based on actual usage of core pool 542 and respective connection type subsets. Ratio trainer 568 may further include core adjustment logic 568.4 for evaluating core usage ratio 568.3 relative to the current core ratio 564.1 to determine whether adjustment is need and, if so, by what adjustment value. For example, core adjustment logic 568.4 may include an algorithm or set of logical rules and thresholds for determining whether core usage ratio 568.3 aligns with current core ratio 564.1 and generating an adjusted core ratio as needed. In some embodiments, core adjustment logic 568.4 may be based on one or more workload models and may use statistical analysis and/or iterative machine learning to determine a best fit workload model to determine the adjusted core ratio.

In some embodiments, ratio trainer 568 may be configured to monitor or access read/write usage values 568.5 for calculating a read/write usage ratio 568.6 based on actual usage of queue pair pool 548 and respective connection type subsets. Ratio trainer 568 may further include queue pair adjustment logic 568.7 for evaluating queue pair usage ratio 568.6 relative to the current queue pair ratio 566.1 to determine whether adjustment is need and, if so, by what adjustment value. For example, queue pair adjustment logic 568.7 may include an algorithm or set of logical rules and thresholds for determining whether queue pair usage ratio 568.6 aligns with current queue pair ratio 566.1 and generating an adjusted queue pair ratio as needed. In some embodiments, queue pair adjustment logic 568.7 may be based on one or more workload models and may use statistical analysis and/or iterative machine learning to determine a best fit workload model to determine the adjusted queue pair ratio.

In some embodiments, request failure logic 570 may include data structures, functions, and/or interfaces configured to reject or fail new connection requests when one or more resource caps or maximums have been reached or exceeded. For example, core allocator 564 and/or queue pair allocator 566 may maintain current connection values for their respective resource pools and connection type subsets and determine when maximum numbers of a connection type are exceeded. Responsive to core allocator 564 and/or queue pair allocator 566 determining that a maximum value has been exceeded, the new connection request may be rejected or failed according to request failure logic 570. In some embodiments, request failure logic 570 may evaluate a failure condition generated by resource allocation engine 560 and provide an appropriate response indicator to host interface 530 and/or the requesting host node to communicate the connection failure.

Figure 6:
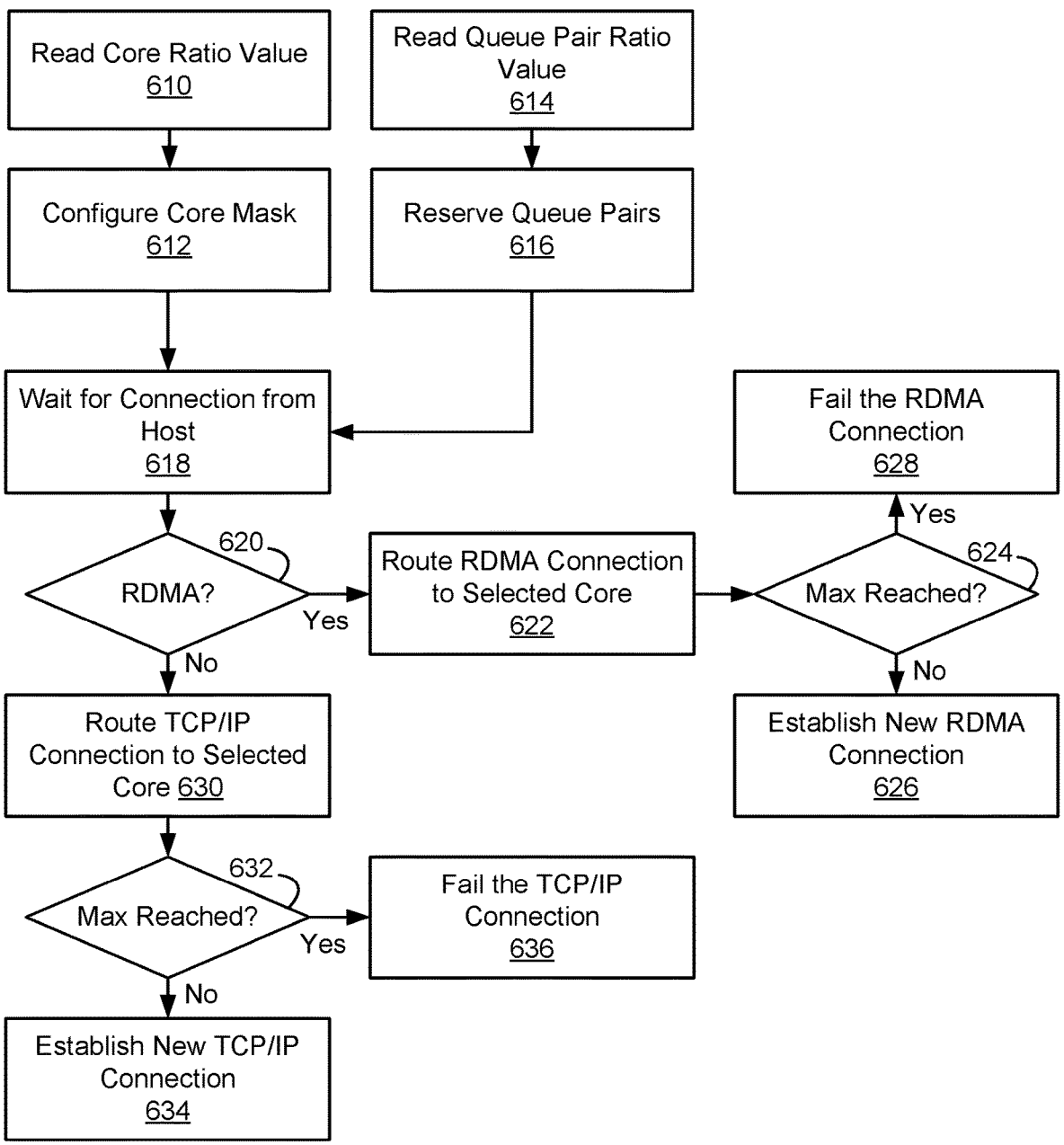
FIG. 6 is a flowchart of an example method of dynamically allocating processor core and queue pair resource pools based on connection type.

As shown in FIG. 6, storage node 500 may be operated according to an example method for dynamically allocating processor core and queue pair resource pools based on connection type, i.e. according to method 600 illustrated by blocks 610-636 in FIG. 6.

At block 610, a core ratio value may be read. For example, the storage node may read a core ratio value from a configuration file or similar source of configurable storage system parameters.

At block 612, a core mask may be configured based on the core ratio value. For example, a resource allocation engine may generate a core mask that directs new connections to a core pool subset appropriate to the connection type.

At block 614, a queue pair ratio value may be read. For example, the storage node may read a queue pair ratio value from the configuration file or similar source of configurable storage system parameters.

At block 616, queue pairs may be reserved for each connection type. For example, the resource allocation engine may reserve subsets of the queue pair pool for each connection type.

At block 618, a new connection from a host system may be waited for. For example, a host interface may monitor for new host connection requests and determine a connection type for the connection request.

At block 620, whether the new connection is an RDMA connection may be evaluated. For example, the resource allocation engine may evaluate whether the connection type is an RDMA connection. If the connection type is RDMA, then method 600 may proceed to block 622. If the connection type is not RDMA, then method 600 may proceed to block 632.

At block 622, the RDMA connection may be routed to a selected core. For example, the resource allocation engine may determine the RDMA core pool subset and select a processor core for the connection.

At block 624, whether a maximum number of connections for the core pool subset may be evaluated. For example, the resource allocation engine may evaluate whether the total number of connections to the RDMA core subset has been reached. If not, method 600 may proceed to block 626. If so, method 600 may proceed to block 628.

At block 626, a new RDMA connection may be established with the selected processor core. For example, the resource allocation engine may establish the new RDMA connection with the selected processor core.

At block 628, the new RDMA connection may be failed. For example, the resource allocation engine may fail the new RDMA connection and send appropriate failure notification to the host system.

At block 630, a TCP/IP connection may be routed to a selected core. For example, the resource allocation engine may determine the TCP/IP core pool subset and select a processor core for the connection.

At block 632, whether a maximum number of connections for the core pool subset may be evaluated. For example, the resource allocation engine may evaluate whether the total number of connections to the TCP/IP core subset has been reached. If not, method 600 may proceed to block 634. If so, method 600 may proceed to block 636.

At block 634, a new TCP/IP connection may be established with the selected processor core. For example, the resource allocation engine may establish the new TCP/IP connection with the selected processor core.

At block 636, the new TCP/IP connection may be failed. For example, the resource allocation engine may fail the new TCP/IP connection and send appropriate failure notification to the host system.

Figure 7:
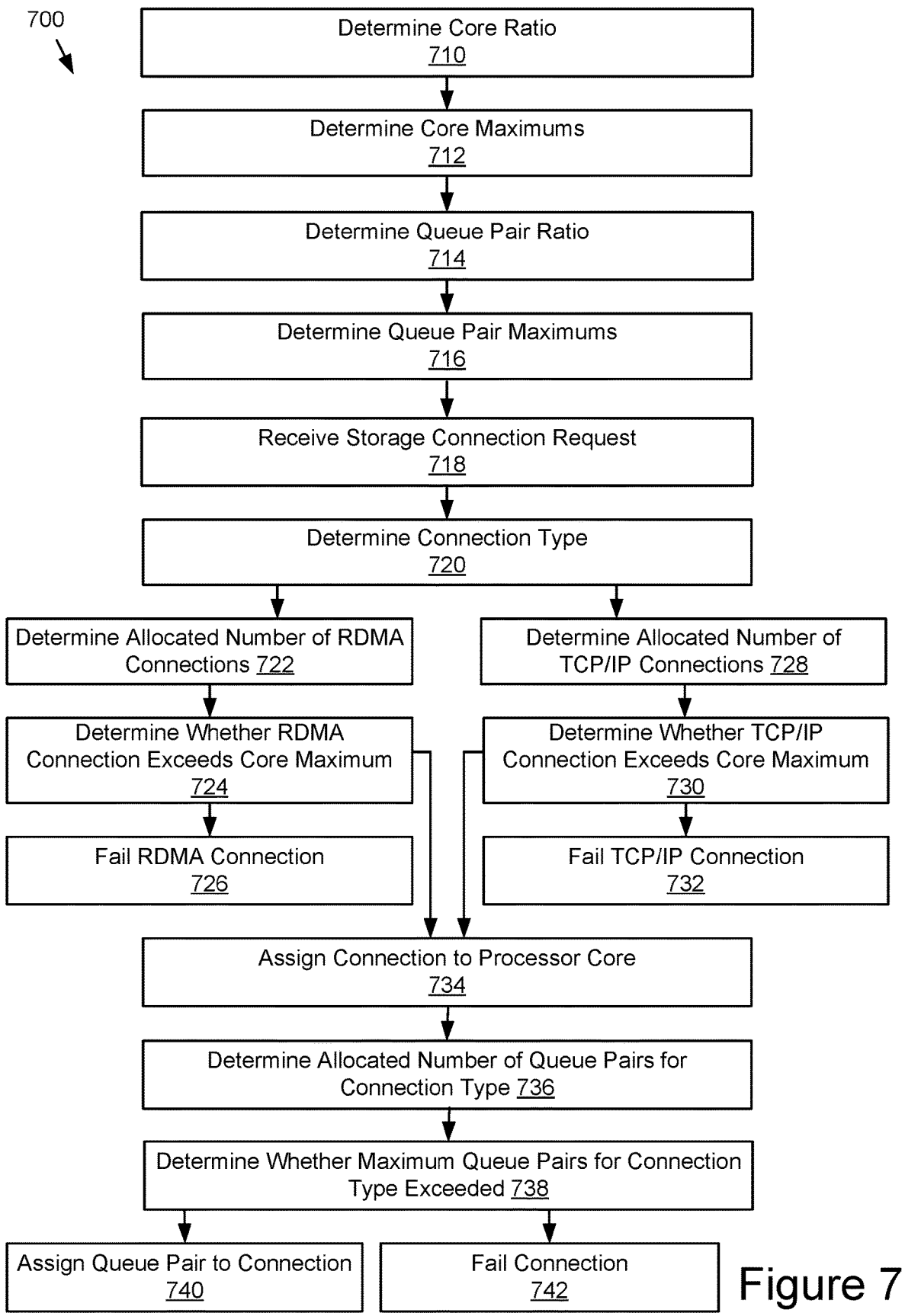
FIG. 7 is a flowchart of another example method of dynamically allocating processor core and queue pair resource pools based on connection type.

As shown in FIG. 7, storage node 500 may be operated according to an example method for dynamically allocating processor core and queue pair resource pools based on connection type, i.e. according to method 700 illustrated by blocks 710-742 in FIG. 7. A storage node or storage controller may be configured for communication with a plurality of storage devices that represent various pools of allocatable storage resources.

At block 710, a core ratio may be determined. For example, a resource allocation engine may determine a processor core ratio between different connection types for the storage node.

At block 712, core maximums may be determined. For example, the resource allocation engine may determine the maximum number of connections that may be allocated to each connection type subset for the core pool based on the core ratio.

At block 714, a queue pair ratio may be determined. For example, the resource allocation engine may determine a queue pair ratio between different connection types for the storage node.

At block 716, queue pair maximums may be determined. For example, the resource allocation engine may determine the maximum number of queue pairs that may be allocated to each connection type subset for the queue pair pool based on the queue pair ratio.

At block 718, a storage connection request may be received. For example, a host interface may receive a host storage connection request for a new host connection with the storage node.

At block 720, a connection type may be determined. For example, the resource allocation engine may determine the connection type from the new host storage connection request.

At block 722, an allocated number of RDMA connections may be determined. For example, responsive to determining the connection type in the connection request is an RDMA connection, the resource allocation engine may determine the current number of RDMA connections allocated from the RDMA subset of the core pool.

At block 724, whether the RDMA connection exceeds the core maximum may be determined. For example, the resource allocation engine may determine that the new RDMA connection request would exceed the core maximum for the RDMA subset.

At block 726, the RDMA connection may be failed. For example, responsive to determining that no available core connections remain in the RDMA subset, the resource allocation engine may fail the new RDMA connection.

At block 728, an allocated number of TCP/IP connections may be determined. For example, responsive to determining the connection type in the connection request is an TCP/IP connection, the resource allocation engine may determine the current number of TCP/IP connections allocated from the TCP/IP subset of the core pool.

At block 730, whether the TCP/IP connection exceeds the core maximum may be determined. For example, the resource allocation engine may determine that the new TCP/IP connection request would exceed the core maximum for the TCP/IP subset.

At block 732, the TCP/IP connection may be failed. For example, responsive to determining that no available core connections remain in the TCP/IP subset, the resource allocation engine may fail the new TCP/IP connection.

At block 734, the connection may be allocated to a processor core. For example, the resource allocation engine may select a processor core from the appropriate core subset for the RDMA or TCP/IP connection request.

At block 736, an allocated number of queue pairs for the connection type may be determined. For example, the resource allocation engine may determine the current number of connections of the connection type that are allocated to that connection type subset of the queue pair pool.

At block 738, whether the connection request exceeds the queue pair maximum for that connection type may be determined. For example, the resource allocation engine may determine that the new connection request would exceed the queue pair maximum for the connection type subset of the new connection request.

At block 740, if the new connection request would not exceed the queue pair maximum, a queue pair may be assigned to the connection. For example, the resource allocation engine may select a queue pair to assign to the new connection request.

At block 742, if the new connection request would exceed the queue pair maximum, the connection may be failed. For example, the resource allocation engine may not select a queue pair and notify the host of the failed connection request.

Figure 8:
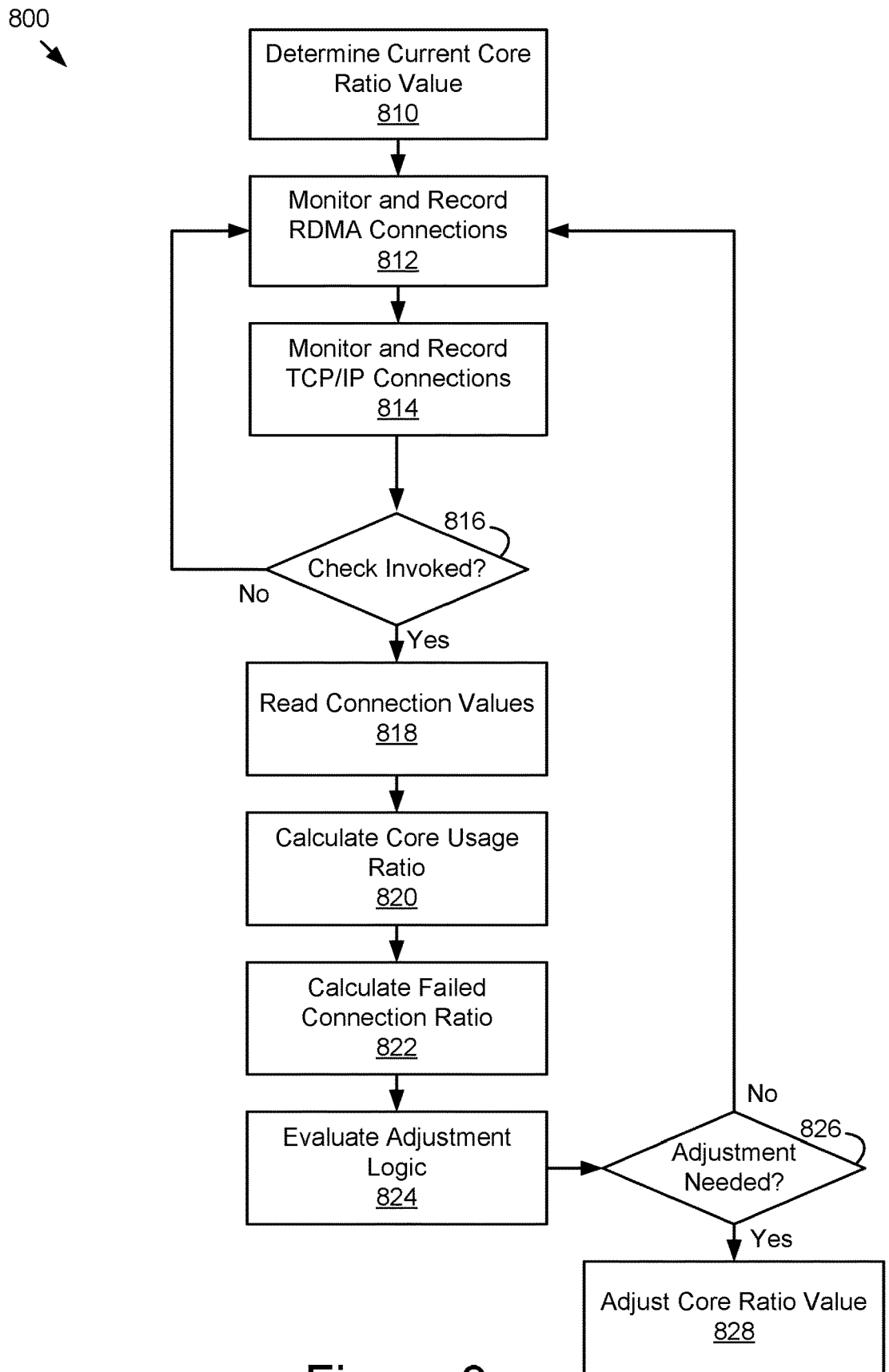
FIG. 8 is a flowchart of an example method of adjusting core ratios based on core usage.

As shown in FIG. 8, storage node 500 may be operated according to an example method an example method of adjusting core ratios based on core usage, i.e. according to method 800 illustrated by blocks 810-828 in FIG. 8.

At block 810, a current core ratio value may be determined. For example, a ratio trainer may determine the current core ratio value from the configuration parameters for the storage node.

At block 812, RDMA connection may be monitored and recorded. For example, the ratio trainer may monitor or access the data from another monitoring service in the storage node for the number of RDMA connections over an operating period.

At block 814, TCP/IP connections may be monitored and recorded. For example, the ratio trainer may monitor or access the data from another monitoring service in the storage node for the number TCP/IP connections over the operating period.

At block 816, whether a core ratio check has been invoked may be evaluated. For example, the ratio trainer may evaluate one or more trigger conditions for initiating a core ratio check. If the core ratio check has been invoked, method 800 may proceed to block 818. If not, method 800 may return to block 812.

At block 818, connection values may be read for both connection types. For example, the ratio trainer may read connection values for the RDMA and TCP/IP connections during the operating period.

At block 820, a core usage ratio may be calculated. For example, the ratio trainer may determine core usage ratios between the RDMA and TCP/IP connections during the operating period, such as average ratio, minimum or maximum ratio, time-based ratios, etc.

At block 822, a failed connection ratio may be calculated. For example, the ratio trainer may use connection failure values to determine failed connection ratios and/or failure adjusted connection ratios.

At block 824, core ratio adjustment logic may be evaluated. For example, the ratio trainer may evaluate an algorithm or set of logical rules for determining whether the core ratio should be adjusted. At block 826, whether adjustment is needed may be evaluated. If yes, method 800 may proceed to block 828. If no, method 800 may return to block 812.

At block 828, the core ratio value may be adjusted. For example, the ratio trainer may adjust the core ratio based on an adjustment value or replacement ratio determined by adjustment logic at block 824.

Figure 9:
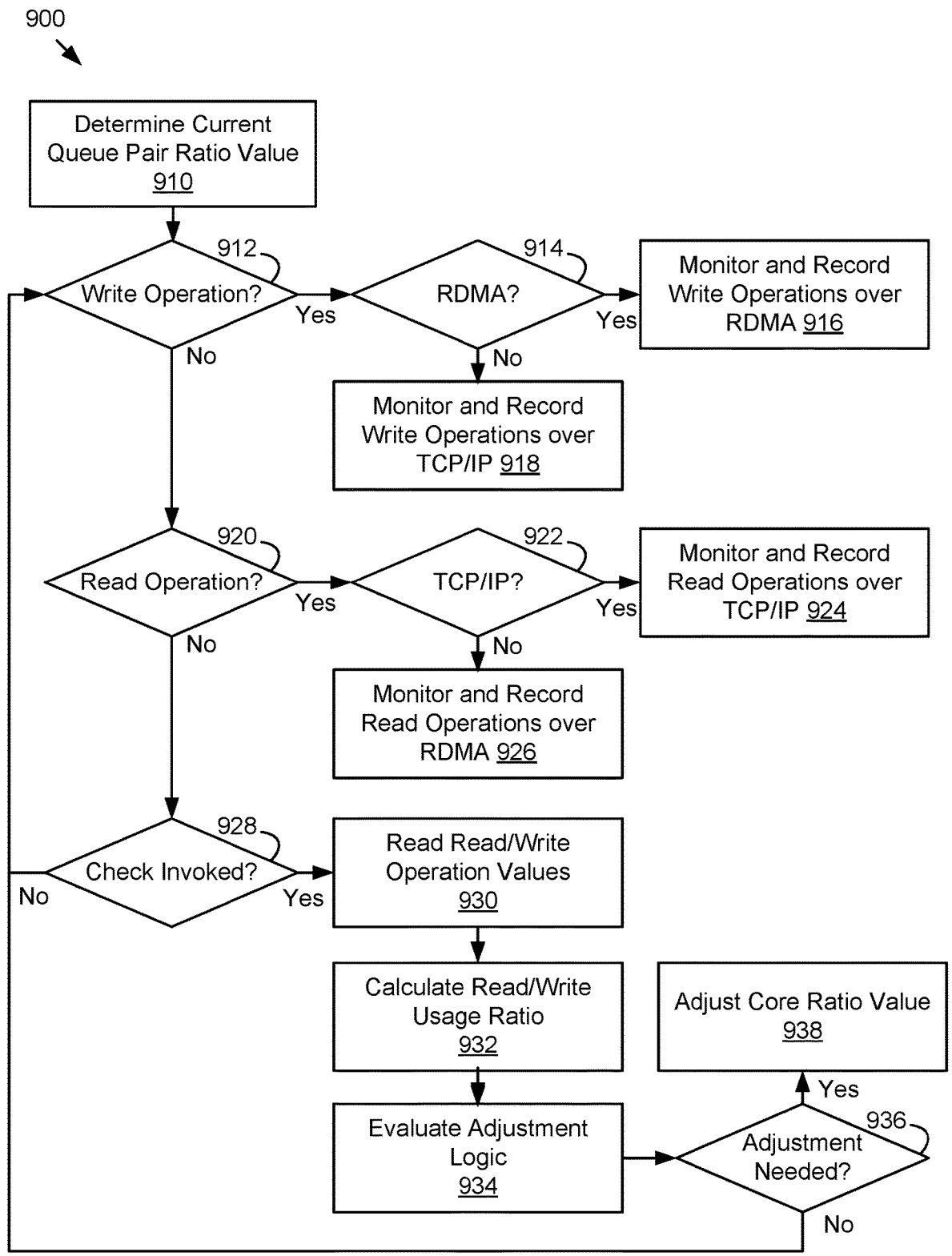
FIG. 9 is a flowchart of an example method of adjusting queue pair ratios based on read/write usage.

As shown in FIG. 9, storage node 500 may be operated according to an example method for adjusting queue pair ratios based on read/write usage, i.e. according to method 900 illustrated by blocks 910-938 in FIG. 9.

At block 910, a current queue pair ratio value may be determined. For example, a ratio trainer may determine the current queue pair ratio value from the configuration parameters for the storage node.

At block 912, whether a write operation has been received may be evaluated. For example, the ratio trainer may respond to a write or read operation. If the operation is a write operation, method 900 may proceed to block 914. If not, method 900 may proceed to block 920.

At block 914, whether the operation has been received over an RDMA connection may be evaluated. For example, the ratio trainer may respond to the connection type. If the connection type is RDMA, method 900 may proceed to block 916. If not, method 900 may proceed to block 918.

At block 916, write operations over the RDMA connection may be monitored and recorded. For example, the ratio trainer may monitor or access the data from another monitoring service in the storage node for the number or volume of write operations over the RDMA connections over an operating period.

At block 918, write operations over TCP/IP connections may be monitored and recorded. For example, the ratio trainer may monitor or access the data from another monitoring service in the storage node for the number or volume of write operations over TCP/IP connections over the operating period.

At block 920, whether a read operation has been received may be evaluated. For example, the ratio trainer may respond to a write or read operation. If the operation is a read operation, method 900 may proceed to block 922. If not, method 900 may proceed to block 928.

At block 922, whether the operation has been received over an TCP/IP connection may be evaluated. For example, the ratio trainer may respond to the connection type. If the connection type is TCP/IP, method 900 may proceed to block 924. If not, method 900 may proceed to block 926.

At block 924, read operations over the TCP/IP connection may be monitored and recorded. For example, the ratio trainer may monitor or access the data from another monitoring service in the storage node for the number or volume of read operations over the TCP/IP connections over an operating period.

At block 926, read operations over RDMA connections may be monitored and recorded. For example, the ratio trainer may monitor or access the data from another monitoring service in the storage node for the number or volume of read operations over RDMA connections over the operating period.

At block 928, whether a core ratio check has been invoked may be evaluated. For example, the ratio trainer may evaluate one or more trigger conditions for initiating a queue pair ratio check. If the queue pair ratio check has been invoked, method 900 may proceed to block 930. If not, method 900 may return to block 912.

At block 930, read/write operation values may be read for both connection types. For example, the ratio trainer may read read/write operation values for the RDMA and TCP/IP connections during the operating period.

At block 932, a read/write usage ratio may be calculated. For example, the ratio trainer may determine read/write usage ratios between the RDMA and TCP/IP connections during the operating period, such as average ratio, minimum or maximum ratio, time-based ratios, etc.

At block 934, queue pair ratio adjustment logic may be evaluated. For example, the ratio trainer may evaluate an algorithm or set of logical rules for determining whether the queue pair ratio should be adjusted. At block 936, whether adjustment is needed may be evaluated. If yes, method 900 may proceed to block 938. If no, method 900 may return to block 912.

At block 938, the queue pair ratio value may be adjusted. For example, the ratio trainer may adjust the queue pair ratio based on an adjustment value or replacement ratio determined by adjustment logic at block 934.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a processor comprising a plurality of processor cores;
   a memory;
   a storage interface configured to:
     communicate with a plurality of data storage devices; and
     support a first connection type and a second connection type; and
   a resource allocation engine configured to:
     determine, for a new storage connection request, a connection type selected from the first connection type and the second connection type;
     determine, based on the connection type, an allocated number for a first connection type subset of a first pool of allocated storage resources, wherein:
       the first pool of allocated storage resources includes assignments to the plurality of processor cores; and
       the first connection type subset of the first pool of allocated resources corresponds to a processor core ratio allocated to a first connection type; and
     establish, responsive to the new storage connection request, a new storage connection with the first connection type subset of the first pool of allocated storage resources.

2. The system of claim 1, wherein the resource allocation engine is further configured to:
   determine a maximum number of connections for the first connection type subset of the first pool of allocated storage resources;
   determine whether the new storage connection request exceeds the maximum number of connections for the first connection type subset of the first pool of allocated storage resources; and
   fail, responsive to the new storage connection request exceeding the maximum number of connections for the first connection type subset of the first pool of allocated storage resources, the new storage connection request.

3. The system of claim 2, wherein the resource allocation engine is further configured to:
   determine, based on the connection type, an allocated number for a second connection type subset of the first pool of allocated storage resources;
   determine a maximum number of connections for the second connection type subset of the first pool of allocated storage resources;
   determine whether the new storage connection request exceeds the maximum number of connections for the second connection type subset of the first pool of allocated storage resources; and
   establish, responsive to the new storage connection request not exceeding the maximum number of connections for the second connection type subset of the first pool of allocated storage resources, the new storage connection with the first pool of allocated storage resources.

4. The system of claim 3, wherein:
the first connection type subset corresponds to the first connection type using a first connection protocol;
the second connection type subset corresponds to the second connection type using a second connection protocol;
the resource allocation engine is further configured to determine an allocation ratio between a first connection type and a second connection type for the first pool of allocated resources; and
the maximum number of connections of the first connection type subset and the maximum number of connections of the second connection type subset correspond to the allocation ratio applied to the first pool of allocated resources.

5. The system of claim 4, wherein:
the first connection type is a remote direct memory access connection for accessing the plurality of data storage devices; and
the second connection type is a transmission control protocol connection for accessing the plurality of data storage devices.

6. The system of claim 2, wherein the resource allocation engine is further configured to:
monitor read/write operations executed through the storage interface;
determine a read/write ratio based on the monitored read/write operations;
adjust, based on the read/write ratio, a resource ratio; and
recalculate, based on the resource ratio, the maximum number of connections for the first connection type subset of the first pool of allocated storage resources.

7. The system of claim 1, wherein the resource allocation engine is further configured to:
determine, based on the connection type, an allocated number for a first connection type subset of a second pool of allocated storage resources;
determine a maximum number of connections for the first connection type subset of the second pool of allocated storage resources;
determine whether the new storage connection request exceeds the maximum number of connections for the first connection type subset of the second pool of allocated storage resources; and
establish, responsive to the new storage connection request not exceeding the maximum number of connections for the first connection type subset of the second pool of allocated storage resources, a new storage connection with the second pool of allocated storage resources.

8. The system of claim 7, wherein:
the memory supports a plurality of queue pairs for managing command queues and storage queues for the plurality of data storage devices;
the second pool of allocated resources includes assignments to the plurality of queue pairs; and
the first connection type subset of the second pool of allocated resources corresponds to a queue pair ratio allocated to the first connection type.

9. The system of claim 8, wherein:
the resource allocation engine is further configured to:
determine the processor core ratio from a set of configuration parameters stored in the memory; and determine the queue pair ratio from the set of configuration parameters stored in the memory; and
the processor core ratio is different from the queue pair ratio.

10. A computer-implemented method, comprising:
configuring a storage node for communication with a plurality of data storage devices, wherein the storage node controls at least one pool of storage resources for allocation to host storage connections;
determining, for a new storage connection request, a connection type selected from a first connection type and a second connection type;
determining, based on the connection type, a first connection type subset of a first pool of allocated storage resources;
determining, based on the connection type, a second connection type subset of the first pool of allocated storage resources;
determining an allocation ratio between the first connection type and the second connection type for the first pool of allocated resources, wherein:
the first connection type subset corresponds to the first connection type using a first connection protocol;
the second connection type subset corresponds to the second connection type using a second connection protocol; and
a maximum number of connections of the first connection type subset and a maximum number of connections of the second connection type subset correspond to the allocation ratio applied to the first pool of allocated resources; and
establishing, responsive to the new storage connection request, a new storage connection with the first connection type subset of the first pool of allocated storage resources.

11. The computer-implemented method of claim 10, further comprising:
determining the maximum number of connections for the first connection type subset of the first pool of allocated storage resources;
determining whether the new storage connection request exceeds the maximum number of connections for the first connection type subset of the first pool of allocated storage resources; and
failing, responsive to the new storage connection request exceeding the maximum number of connections for the first connection type subset of the first pool of allocated storage resources, the new storage connection request.

12. The computer-implemented method of claim 10, further comprising:
determining the maximum number of connections for the second connection type subset of the first pool of allocated storage resources;
determining whether the new storage connection request exceeds the maximum number of connections for the second connection type subset of the first pool of allocated storage resources; and
establishing, responsive to the new storage connection request not exceeding the maximum number of connections for the second connection type subset of the first pool of allocated storage resources, the new storage connection with the first pool of allocated storage resources.

13. The computer-implemented method of claim 10, wherein:
   the first connection type is a remote direct memory access connection for accessing the plurality of data storage devices; and
   the second connection type is a transmission control protocol connection for accessing the plurality of data storage devices.

14. The computer-implemented method of claim 10, further comprising:
   assigning each host storage connection to a processor core of a plurality of processor cores, wherein:
      the first pool of allocated resources includes assignments to the plurality of processor cores; and
      the first connection type subset of the first pool of allocated resources corresponds to a processor core ratio allocated to the first connection type.

15. The computer-implemented method of claim 14, further comprising:
   determining, based on the connection type, a first connection type subset of a second pool of allocated storage resources;
   determining a maximum number of connections for the first connection type subset of the second pool of allocated storage resources;
   determining whether the new storage connection request exceeds the maximum number of connections for the first connection type subset of the second pool of allocated storage resources; and
   establishing, responsive to the new storage connection request not exceeding the maximum number of connections for the first connection type subset of the second pool of allocated storage resources, the new storage connection with the second pool of allocated storage resources.

16. The computer-implemented method of claim 15, further comprising:
   assigning at least one queue pair from a plurality of queue pairs to each host connection, wherein:
      the second pool of allocated resources includes assignments of the plurality of queue pairs;
      the plurality of queue pairs manages command queues and storage queues for the plurality of data storage devices; and
      the first connection type subset of the second pool of allocated resources corresponds to a queue pair ratio allocated to the first connection type.

17. The computer-implemented method of claim 16, further comprising:
   monitoring read/write operations executed through a storage interface of the storage node;
   determining a read/write ratio based on the monitored read/write operations;
   adjusting, based on the read/write ratio, a resource ratio; and
   recalculating, based on the resource ratio, the maximum number of connections for the first connection type subset of the first pool of allocated storage resources.

18. A storage system comprising:
   a processor;
   a memory;
   a plurality of storage devices;
   means for determining, for a new storage connection request, a connection type selected from a first connection type and a second connection type;
   means for determining, based on the connection type, a first connection type subset of a first pool of allocated storage resources;
   means for determining a maximum number of connections for the first connection type subset of the first pool of allocated storage resources, wherein the means for determining the maximum number of connections is configured to
      monitor read/write operations executed through a storage interface to the plurality of storage devices;
      determine a read/write ratio based on the monitored read/write operations;
      adjust, based on the read/write ratio, a resource ratio; and
      recalculate, based on the resource ratio, the maximum number of connections for the first connection type subset of the first pool of allocated storage resources;
   means for determining whether the new storage connection request exceeds the maximum number of connections for the first connection type subset of the first pool of allocated storage resources; and
   means for establishing, responsive to the new storage connection request not exceeding the maximum number of connections for the first connection type subset of the first pool of allocated storage resources, a new storage connection with the first pool of allocated storage resources.

19. The storage system of claim 18, further comprising:
   means for assigning each host storage connection to a processor core of a plurality of processor cores, wherein:
      the first pool of allocated resources includes assignments to the plurality of processor cores; and
      the first connection type subset of the first pool of allocated resources corresponds to a processor core ratio allocated to the first connection type.

20. The storage system of claim 18, further comprising:
   means for determining, based on the connection type, a second connection type subset of the first pool of allocated storage resources; and
   means for determining an allocation ratio between the first connection type and the second connection type for the first pool of allocated resources, wherein:
      the first connection type subset corresponds to the first connection type using a first connection protocol;
      the second connection type subset corresponds to the second connection type using a second connection protocol; and
      the maximum number of connections of the first connection type subset and a maximum number of connections of the second connection type subset correspond to the allocation ratio applied to the first pool of allocated resources.

* * * * *